UNITED STATES PATENT OFFICE.

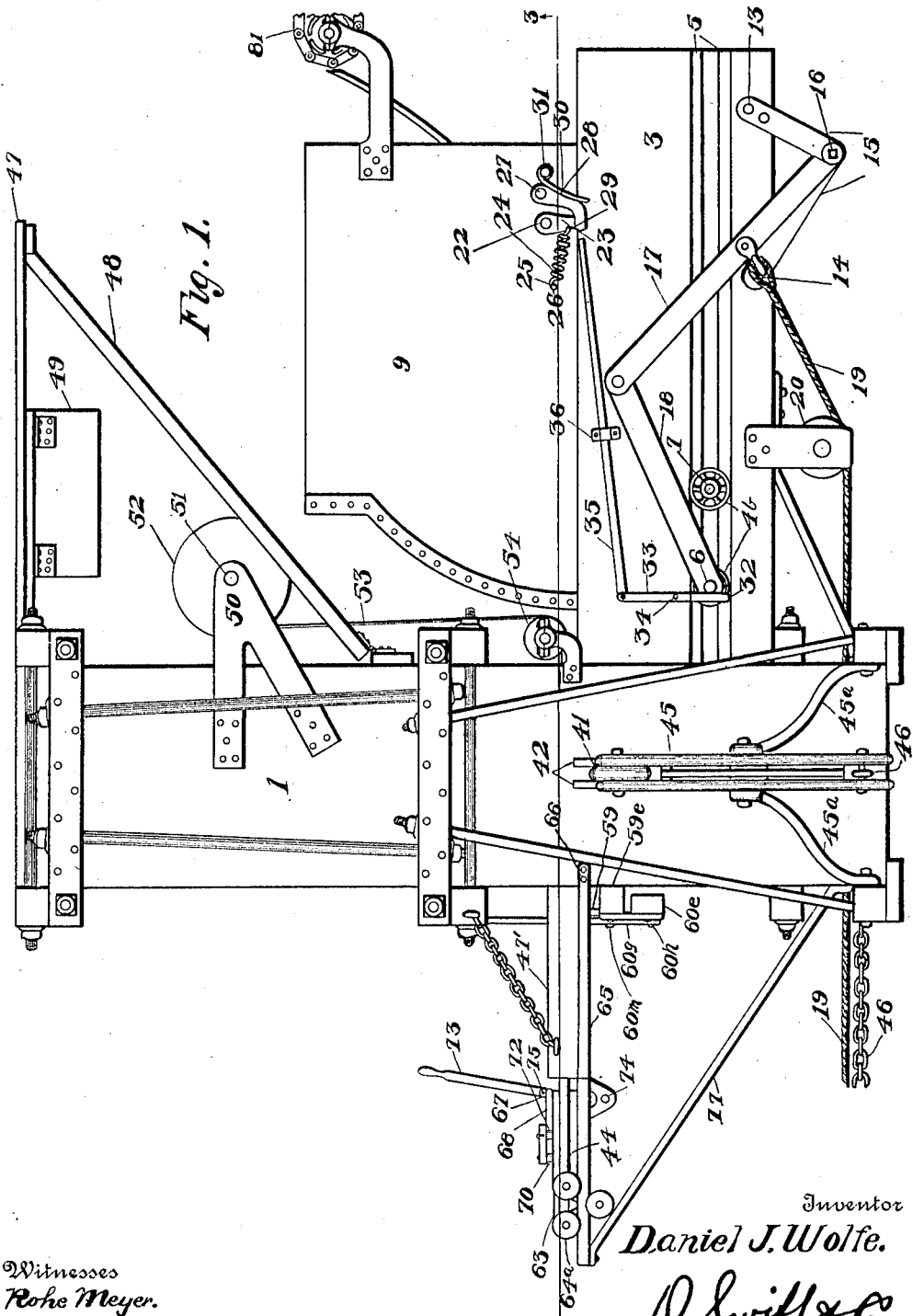

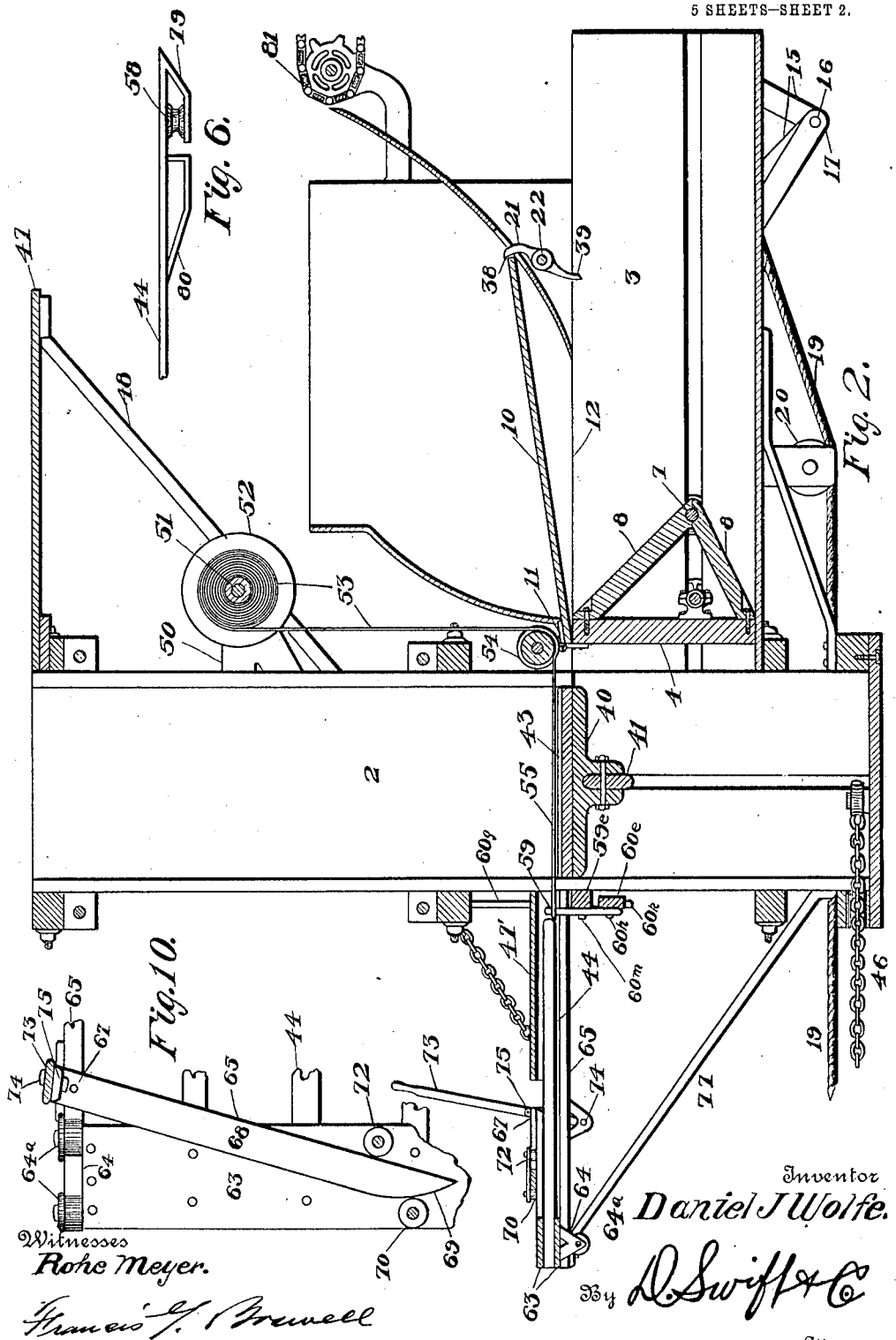

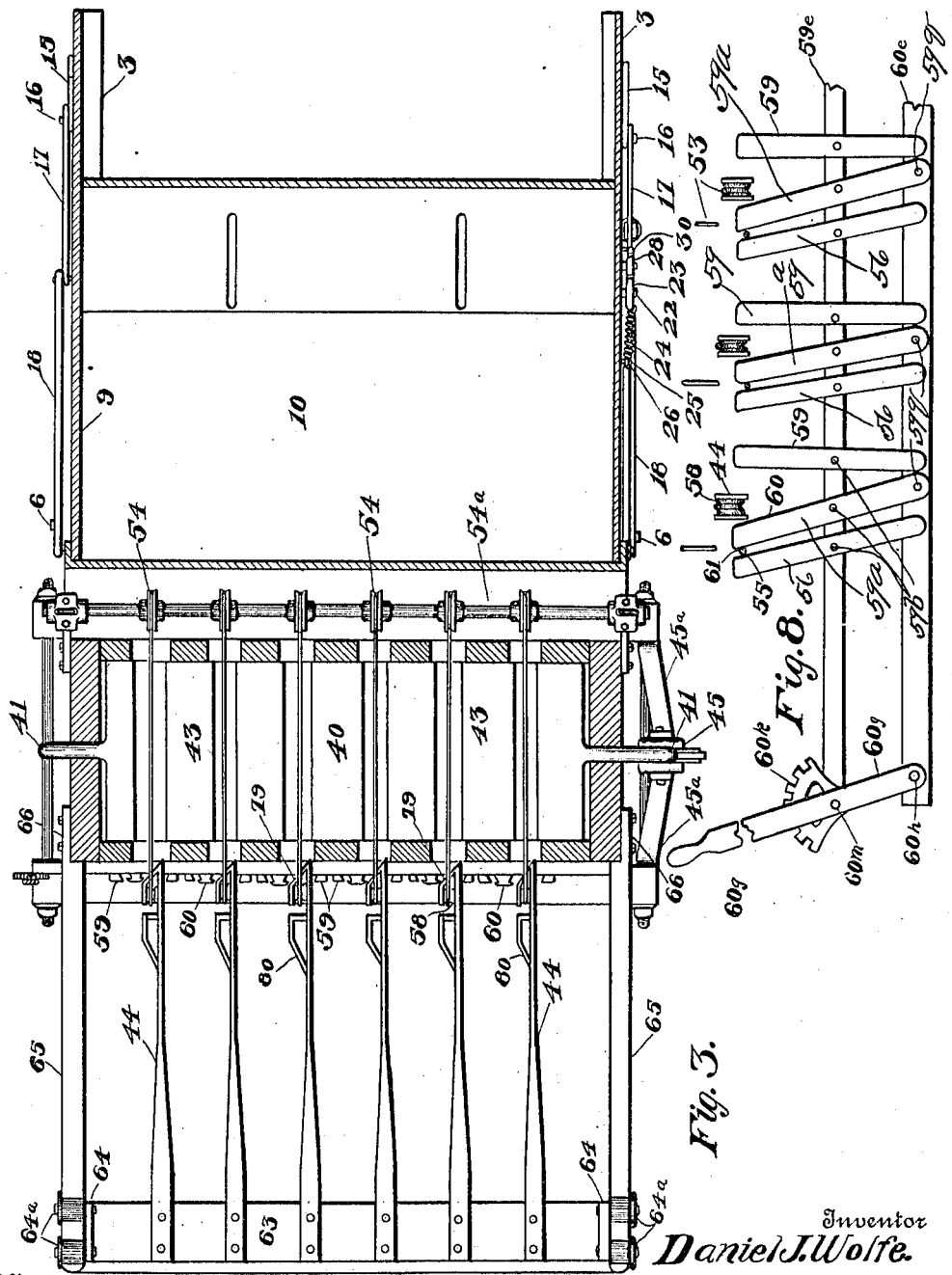

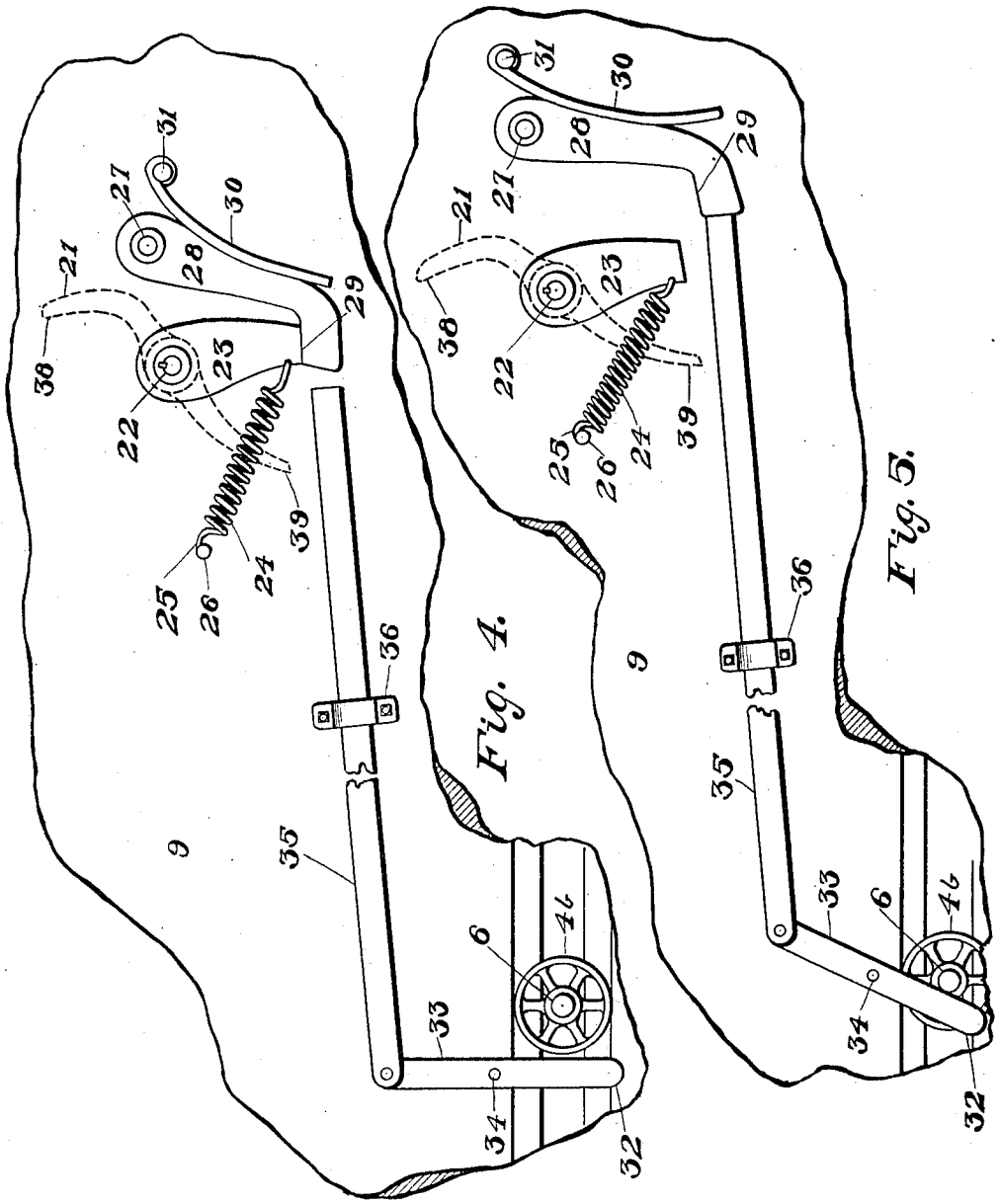

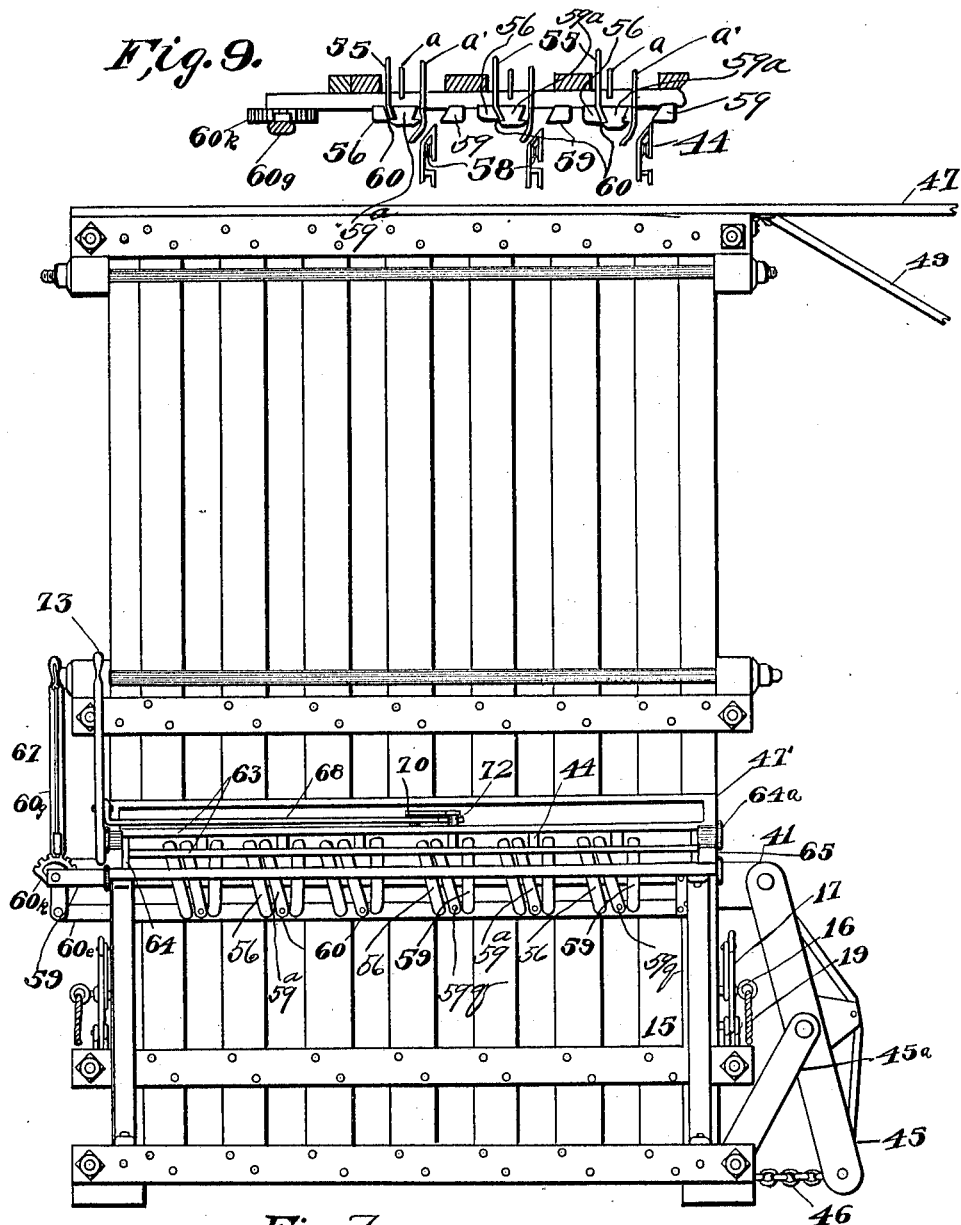

DANIEL J. WOLFE, OF GILROY, CALIFORNIA.

HAY-PRESS.

1,048,623.  Specification of Letters Patent.  Patented Dec. 31, 1912.

Application filed March 11, 1912. Serial No. 682,912.

*To all whom it may concern:*

Be it known that I, DANIEL J. WOLFE, a citizen of the United States, residing at Gilroy, in the county of Santa Clara and State of California, have invented a new and useful Hay-Press; and I do hereby declare the following to be a full, clear, and exact description of the invention, such as will enable others skilled in the art to which it appertains to make and use the same.

This invention relates to a new and useful hay press adapted for baling hay and the like and discharging it from the upper portion, the baling chamber being fed below.

The principal object of the invention is the provision of a baling chamber through which more than one bale is being forced while baling, so that as a lowermost bale is being raised in position to be bound with wire, an uppermost bale is being discharged.

It is a further object of the invention to provide a plunger for packing the hay in bales and a cut-off door actuated by the plunger for cutting off the feed.

Another object of the invention is the provision of a locking device actuated automatically by the plunger for locking the door, and then automatically actuated by the plunger on a further movement thereof to release the door.

It is the aim of the invention to devise a hay press of this nature, in which various improved, essential, efficient and desirable features of construction are involved.

One of the features of the construction resides in a plurality of needles adapted to be fed transversely of the bale chamber, all at the same time and through transverse grooves of the follower, for drawing the baling wire finally about the bale, so that a portion may be gripped by clamps, while, at the same time, another portion is being severed and the two ends of the wire about the bale are being tied.

The invention comprises further features and combinations of parts, as hereinafter set forth, shown and claimed.

In the drawings, Figure 1 is a view in side elevation, showing the improved hay press constructed in accordance with the invention. Fig. 2 is a vertical sectional view. Fig. 3 is a sectional view on line 3—3 of Fig. 1, showing the plurality of needles. Fig. 4 is a detail view in side elevation, showing the locking mechanism for the door, showing in full lines the position of the locking mechanism prior to being actuated by the plunger to lock the door. Fig. 5 is a view similar to Fig. 4, showing the locking mechanism after having been actuated by the plunger. Fig. 6 is an enlarged detail view of the piercing end of one of the needles. Fig. 7 is a rear view of the press, showing the manner in which the needles are actuated. Fig. 8 is a view in elevation of the clamps and the severing devices. Fig. 9 is a plan view partly in section of the clamps and the severing devices. Fig. 10 is a fragmentary view of the frame carrying the needles, showing the means for shifting the same.

Referring to the drawings, 1 designates the frame of the hay press, the main portion of which is provided with a baling chamber 2. The supplemental frame 3 receives the plunger 4, there being guides 5, in which extensions 6 of the plunger are guided. The plunger is provided with a plunger bar 7 which may be actuated by any suitable means, preferably horse-power. However, a suitable engine may be substituted therefor. The plunger is braced relatively to the plunger bar by the braces 8. Extending upwardly from the supplemental frame is an offset chute 9, in which the door 10 is arranged, for cutting off the feed of the hay. This door is hingedly connected, as at 11, to the plunger. As the plunger is forced through the supplemental frame, the door 10 is actuated to close the passage 12 between the chute and the supplemental frame.

Secured to the supplemental frame, as at 13 and 14, is a pair of bars 15, which are connected, as at 16. Also pivoted at the point 16 is a lever 17, one upon each side of the supplemental frame. These levers 17 have link connections 18 with two of the extensions 6 of the plunger, whereby, as the levers 17 are actuated, the plunger is moved forwardly in the supplemental frame. The point 16 comprises a rod to which the levers 17 are rigidly fixed. Connected to one of the levers 17 is a cable or the like 19, which passes over a pulley 20, which, in turn, is connected to the horse-power apparatus. As one of the levers 17 is actuated, the other is moved at the same time.

Extending transversely of the supplemental frame is a rod 22, and fixed to the rod is a pair of latch locking dogs 21.

Fixed to one end of the rod 22 is a pawl 23, to the free end of which a spring 24 is connected. The end 25 of the spring is fixed at the point 26 to the side of the chute 9. Pivoted at 27 to one side of the supplemental frame is a lever 28, having a shoulder 29, which is engaged by the pawl 23. A spring 30 fixed at 31 to the supplemental frame bears against the lever 28 and holds the shoulder in engagement with the pawl 23. The normal positions of these parts are as shown in Fig. 1. As the plunger moves forwardly of the supplemental frame, a portion of the extension 6 strikes the end 32 of the lever 33 pivoted at 34 and actuates the rod 35, which is pivoted to the upper end of the lever 33. The rod 35 is mounted in a guide 36. When the rod 35 is actuated, the rear end thereof engages the lever 28, thereby disengaging the shoulder thereof from the pawl 23, against the action of the spring 30. When the pawl 23 is thus released, the spring 24 actuates the pawl to the position, as shown in Fig. 4 and as the latch locking dogs 21 are carried by the rod 22, the noses 38 of the dogs are thrown from the path of the door 10, so that the door will open as the plunger moves rearwardly of the supplemental frame. As the plunger reaches its rearward position, it contacts with the arms 39 of the dogs 21, thereby rocking them, and also the rod 22. By virtue of this action, the pawl 21 is again thrown in engagement with the shoulder 29 of the lever 28, thus holding the dogs 21 in the positions shown in Fig. 1. As the door 10 moves to a closed position, the rear upper end thereof passes over the noses 38 of the dogs 21, thereby locking the same closed, until the plunger moves rearwardly.

The object of the locking dog 21 is to hold the door 10 locked in position, and furthermore in case the plunger 4 is accidentally moved rearwardly before its time for such movement, the locking dogs 21 will tend to retard such movement. Referring to Fig. 1 of the drawings the rod 35 has not been operated to engage the lever 28, so as to disengage it from the pawl 23, and these actions will not take place, until the plunger 4 is moved farther forwardly, than that shown in Figs. 1 and 2.

Mounted vertically movable in the baling chamber is a follower 40, each end of which is provided with an extension 41. The extensions 41 are mounted in guides 42 of the frame 1. The follower 40 is provided with a plurality of transverse grooves 43, through which the needles 44 extend. The follower is raised vertically in the baling chamber by the lever 45, which is actuated by the means 46.

Projecting laterally from the upper portion of the frame 1 is a platform 47 braced by the bars 48. This platform is for the purpose of holding the operator at the top of the machine, whereby he may receive the bales as they are discharged. After each bale is discharged from the chamber of the frame 1, it is allowed to slide down the bale slide 49. Below the platform, and secured to the sides of the frame 1, is a pair of bracket members 50. Journaled in the bracket members 50 is a shaft 51, on which is mounted a plurality of reels 52 containing baling wire 53. The wires of the various reels pass under the pulleys 54, and upon first operating the machine, the ends of the wires are manually extended transversely of the upper portion of the baling chamber, as at 55, and are caught by the clamps 56 and 59$^a$, as shown in Fig. 9. As a bale is formed in the bale chamber 2, and subsequently forced upwardly in the chamber, the various wires are arranged about two sides and the upper end of the bale. At this period, the needles 44 are operated by the operator upon the platform 47, so as to move transversely of the frame 1, and through the transverse grooves 43. When the needles reach the limit of their transverse movement across the frame 1, the wires assume positions behind the pulleys 58 of the needles. The needles are then withdrawn from transversely of the frame 1 and with them the wires. In this manner, the wires are drawn around the lower end of each bale. As the needle points reach their rearward positions, portions of the wires are caught by the other clamps 59 and the clamps 59$^a$, while other portions are severed by the cutting edges 60 of the clamps 59$^a$. The clamps 56, 59, and 59$^a$ are pivoted at 59$^b$ to the strip 59$^e$, which is arranged in a fixed position transversely of the needles. To one end of the strip 59$^e$ a lever 60$^g$ is pivoted, which is adapted to have the usual grip actuated dog (not shown), to engage the teeth of the rack 60$^k$, to hold the lever in adjusted positions. The lever 60$^g$ is pivoted at 60$^m$ to the strip 59$^e$, while the lower end of the lever is pivoted at 60$^h$ to the strip 60$^e$, to which the clamps 59$^a$ are pivoted at 59$^q$. When the lever 60$^g$ is operated, the strip 60$^e$ is moved in a direction transversely of the needle, thus throwing the upper ends of the clamps 59$^a$ toward one or the other of the clamps 56 and 59, in order to catch the wire. As soon as the wire is caught it is instantly severed thereafter by the cutting edges 60. These clamps are actuated by the operator on the platform 47. The wires about the bale are then twisted by another operator. The wires which are caught by the clamps and designated by the numeral 61, support the bale which has been bound, so that the follower may be lowered to receive the next bale from the supplemental frame.

The needles 44 are carried by a frame 63, each end of which is formed with a triangular frame 64. The triangular frames 64 of the frame 63 have anti-frictional wheels 64ᵃ, between which the guides (which are secured at 66 to the frame 1) of the frame 65 are guided, thereby avoiding undue friction.

Pivoted at 67 to the frame 65 is a lever 68, the curved edge 69 at the free end of the lever contacting with a roller 70 on the frame 63, so as to operate the frame to withdraw the needles from the frame 1. To cause the needles to move through the frame 1, the lever 68 contacts with the roller 72. A lever 73 pivoted at 74 to the frame 1 is connected, as at 75, to the lever 68. The operator, by manipulating the lever 73, may actuate the frame 63 to extend the needles through or withdraw them from the frame 1. The frame 65 is braced by the bars 77.

The end of each needle is provided with a strap 79 to guide the wire behind the pulley 58, while an additional metal strap 80 is secured in the rear of the pulley 58, so as to prevent displacement of the wire. The strap 80 not only prevents displacement of the wire, but keeps the hay from becoming clogged about the pulley 58.

The chute is fed by means of a draper or endless elevator 81. When the chute is fed, the plunger is in a rearward position. The hay falls in front of the plunger. When there is a sufficient amount of hay to form a bale, the plunger is moved forward of the supplemental frame, by a pulling action upon the cable 19. As the plunger moves forward, the rear end of the door 10 slides over the noses 38 of the dogs 21, thus holding the same closed. By this movement of the plunger, the hay forming the bale is forced into the bale chamber upon the follower. The plunger is permitted to move a trifle farther, which thoroughly packs the bale. By this further movement, the extension 6 of the plunger actuates the lever 33, which, in turn, reciprocates the bar 35. This bar 35 actuates the lever 28, thus releasing the pawl 23 from engagement with the shoulder 29 of the lever 28. As the pawl 23 is released, the spring 24 throws the noses 38 of the dogs 21 from the path of the rear end of the door 10, so that the same may assume the position shown in Figs. 1, 2, 4, and 5, upon the rearward movement of the plunger. However, prior to moving the plunger rearwardly, after the bale is forced into the chamber 2, the follower is elevated, and with it the bale. The bale is raised until its lower end reaches a distance slightly above the plane of the needles 44. The needles 44 are then moved through the grooves 43 of the follower so as to engage the wires. Subsequently, the needles are withdrawn, bringing the wires with them, which are clamped by the clamps and then severed. At this period, the follower is lowered, and, at the same time, the plunger is moved rearwardly. Each of the consecutive bales is formed, bound and tied, and finally discharged in a similar manner.

From the foregoing, it will be noted that there has been devised an efficient, practical and desirable hay press, and one which will economize on space and labor, and, at the same time, bale more percentage of hay than the average press now in the field.

The invention having been set forth, what is claimed as new and useful is:—

1. In combination, a baling chamber in which bales are adapted to be formed, a guide frame, a reciprocatory frame guided therein and provided with needles adapted to be extended transversely of the chamber, the reciprocatory frame having a pair of rollers, a lever pivoted to the guide frame with its free end operable between the rollers to move the reciprocatory frame, and manually operated means for actuating the pivoted lever.

2. In a hay press, a main frame having a baling chamber therein, a supplemental frame extending from the main frame and provided with a chute thereabove through which the hay is fed, a plunger operable in the supplemental frame to force the hay into the bale chamber as it is fed through the chute, a door connected to the plunger adapted to close the passage between the chute and the supplemental frame, and a locking device for holding the door locked.

3. In a hay press, a main frame having a baling chamber, a follower operable vertically therein, a supplemental frame extending from the main frame and provided with a chute thereabove through which the hay is fed, the supplemental frame having guides, a plunger operable in the supplemental frame and guided by the guides to force the hay into the bale chamber as it is fed through the chute, a door connected to the plunger adapted to close the passage between the chute and the supplemental frame as the plunger presses the hay into the bale chamber, and a locking device normally in locking position to hold the door locked while the follower raises the bale.

4. In a hay press, a main frame having a baling chamber, a follower operable vertically therein, a supplemental frame extending from the main frame and provided with a chute thereabove through which the hay is fed, the supplemental frame having guides, a plunger operable in the supplemental frame and guided by the guides to force the hay into the bale chamber as it is fed through the chute, a door connected to the plunger adapted to close the passage between the chute and the supplemental frame as the plunger presses the hay into the bale chamber, a locking device normally in locking position to hold the door locked while the follower raises the bale, and a wire binding mechanism for binding the bale, the wire constituting means to support the bale while the follower lowers and another bale is disposed thereon.

5. In a hay press, a main frame having a baling chamber, a follower operable vertically therein, a supplemental frame extending from the main frame and provided with a chute thereabove through which the hay is fed, the supplemental frame having guides, a plunger operable in the supplemental frame and guided by the guides to force the hay into the bale chamber as it is fed through the chute, a door connected to the plunger adapted to close the passage between the chute and the supplemental frame as the plunger presses the hay into the bale chamber, a locking device normally in locking position to hold the door locked while the follower raises the bale, and means actuated by the plunger upon its forward stroke to throw the locking device out of locking position, so that the door may open as the plunger moves rearwardly.

6. In a hay press, a main frame having a baling chamber, a follower operable vertically therein, a supplemental frame extending from the main frame and provided with a chute thereabove through which the hay is fed, the supplemental frame having guides, a plunger operable in the supplemental frame and guided by the guides to force the hay into the bale chamber as it is fed through the chute, a door connected to the plunger adapted to close the passage between the chute and the supplemental frame as the plunger presses the hay into the bale chamber, a locking device normally in locking position to hold the door locked while the follower raises the bale, means actuated by the plunger upon its forward stroke to throw the locking device out of locking position, so that the door may open as the plunger moves rearwardly, the plunger adapted to actuate the locking device on its rearward movement to throw the same into locking position.

7. In a hay press, a main frame having a baling chamber, a follower operable vertically therein, a supplemental frame extending from the main frame and provided with a chute thereabove through which the hay is fed, the supplemental frame having guides, a plunger operable in the supplemental frame and guided by the guides to force the hay into the bale chamber as it is fed through the chute, a door connected to the plunger adapted to close the passage between the chute and the supplemental frame as the plunger presses the hay into the bale chamber, a locking device normally in locking position to hold the door locked while the follower raises the bale, means actuated by the plunger upon its forward stroke to throw the locking device out of locking position, so that the door may open as the plunger moves rearwardly, the plunger adapted to actuate the locking device on its rearward movement to throw the same into locking position, and means automatically actuated by the plunger to restore the locking device in locking position.

8. In a hay press, a strip secured to the frame of the press, a series of clamps pivoted in pairs to the strip, a second series of clamps, each being pivoted to the strip between the clamps of each pair, to coöperate with one or the other of the first clamps, a reciprocating strip to which the second clamps are pivoted, and means for shifting the reciprocating strip.

9. In a hay press, a strip secured to the frame of the press, a series of clamps pivoted in pairs to the strip, a second series of clamps, each being pivoted to the strip between the clamps of each pair, to coöperate with one or the other of the first clamps, a reciprocating strip to which the second clamps are pivoted, and means for shifting the reciprocating strip, the second clamps having severing edges adapted to cut a wire substantially instantly after the same is caught by the clamp.

10. In a hay press comprising a main frame having a baling chamber with a follower operable therein, the main frame having supplemental frame with a reciprocating plunger therein and provided with a chute, the plunger having a door connected thereto to cut off the passage of the hay through the chute, and a locking mechanism for locking the door when the plunger is in its forward position.

11. In a hay press having a baling chamber and provided with a follower mechanism, a plunger feed mechanism having a door connected thereto, a chute through which the hay is fed, the feeding of which hay is adapted to be cut off by the door when the plunger feed mechanism is moved forwardly, and a locking mechanism for locking the door when the plunger mechanism is in such forward position.

12. In a hay press having a baling chamber and provided with a follower mechanism, a plunger feed mechanism having a door connected thereto, a chute through which the hay is fed, the feeding of which hay is adapted to be cut off by the door when the plunger feed mechanism is moved forwardly, and a locking mechanism for locking the door when the plunger mechanism is in such forward position, and means actuated by the plunger mechanism upon a further partial forward movement thereof to unlock the locking mechanism to release the door.

13. In a baling press comprising a baling chamber with a follower mechanism therein and provided with a wire threading mechanism, which includes means for severing the wire, a feeding plunger mechanism for pressing the hay in the baling chamber, a door, a chute, the hay passage of which is cut off by the door when the feeding plunger mechanism moves forwardly, a locking mechanism for locking the door when the feeding plunger mechanism is in its forward position, and means actuated by the feeding plunger mechanism on a further partial forward movement of the feeding plunger mechanism to unlock the locking mechanism to release the door.

In testimony whereof I have signed my name to this specification in the presence of two subscribing witnesses.

DANIEL J. WOLFE.

Witnesses:
W. P. DOWDY,
M. C. FITZGERALD.

Copies of this patent may be obtained for five cents each, by addressing the "Commissioner of Patents, Washington, D. C."